United States Patent
Rathnam et al.

(10) Patent No.: US 6,765,622 B2
(45) Date of Patent: Jul. 20, 2004

(54) LINE-BUFFER REUSE IN VERTICAL PIXEL-PROCESSING ARRANGEMENT

(75) Inventors: Selliah Rathnam, Pleasant, CA (US); Chien-Hsin Lin, Sunnyvale, CA (US); Gwo Giun Lee, Dublin, CA (US); Shaori Guo, Sunnyvale, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 448 days.

(21) Appl. No.: 10/046,533

(22) Filed: Oct. 26, 2001

(65) Prior Publication Data

US 2003/0081858 A1 May 1, 2003

(51) Int. Cl.$^7$ .............................. H04N 9/74; H04N 7/01
(52) U.S. Cl. ........................ 348/581; 348/441; 382/298; 382/260
(58) Field of Search ................................ 348/581, 582, 348/561, 562, 704, 571, 708, 441, 458; 382/298, 260, 299, 261, 264, 265; 345/660, 670, 671; H04N 9/74, 7/01

(56) References Cited

U.S. PATENT DOCUMENTS

| | | |
|---|---|---|
| 5,587,742 A | 12/1996 | Hau et al. |
| 6,031,546 A * | 2/2000 | Shimizu ...................... 345/656 |
| 6,219,464 B1 * | 4/2001 | Greggain et al. ........... 382/298 |
| 6,281,873 B1 * | 8/2001 | Oakley ........................ 348/581 |
| 6,600,495 B1 * | 7/2003 | Boland et al. ............... 348/581 |

FOREIGN PATENT DOCUMENTS

| | | |
|---|---|---|
| EP | 0 807 922 | 11/1997 |
| WO | WO 02 30115 | 4/2002 |

* cited by examiner

Primary Examiner—Sherrie Hsia
(74) Attorney, Agent, or Firm—Michael J. Urf

(57) ABSTRACT

A pixel-data processing circuit adapted to resize pixel data in a first vertically processing mode is reconfigurable to operate in a nonresizing mode, wherein each mode receives pixel data at a first pixel rate and outputs pixel data at a different pixel rate. In one particular example embodiment, pixels are received at two pixels per cycle and output to a storage unit at one pixel per cycle. In a first operational resizing mode, the embodiment includes vertically processing pixel data including polyphase filtering and line-buffering the pixel data, resizing the received pixel data by circulating the data in the line buffers and by filtering the circulated data for the polyphase filtering, and presenting resized pixel data for storage at the first pixel rate. In a second operational nonresizing mode, the pixel data is processed by double-line buffering the pixel data, bypassing the polyphase filtering, and presenting nonresized pixel data for storage at the rate of one pixel per cycle. Using a control circuit, the pixel-data processing circuit can switch between the first operational resizing mode and the second operational nonresizing mode.

28 Claims, 2 Drawing Sheets

LINE-BUFFER REUSE IN VERTICAL PIXEL-PROCESSING ARRANGEMENT

FIELD OF THE INVENTION

The present invention is directed to video signal processing and, more particularly, to video signal processing which employs a vertical pixel signal processing block, such as a polyphase filter.

BACKGROUND

Computer arrangements, including microprocessors and digital signal processors, have been designed for a wide range of applications and have been used in virtually every industry. For a variety of reasons, many of these applications have been directed to processing video data and have demanded minimal levels of power consumption and compactness. Some applications have further demanded a high-speed computing engine that can perform effectively on a real-time or near real-time basis. Many of these video-processing applications have required a data-signal processing circuit that is capable of performing multiple functions at ever-increasing speeds.

Increasing the power and versatility of such computing engines, however, can undermine other important goals. For example, faster computing engines consume more power and circuit real estate, whereas the ideal engine minimizes both power consumption and the amount of circuitry required to implement the computing engine.

Moreover, providing versatility and high power typically exacerbates the circuit real estate problem by requiring various types of processing circuitry, each specialized and selectively activated for different processing functions. This phenomena can be appreciated when comparing, for instance, relatively-slow general-purpose processing in video applications versus specialized video-signal filter processing used for compressing and decompressing video data in real time. Because the specialized processing circuitry is typically optimized to keep up with the real-time speeds of the video data, it is often difficult to provide a single video-data processing circuit that is adequately versatile without providing seemingly excess circuitry useful only for limited applications.

As a more particular example, many video-signal processing applications employ specialized video-signal filters for vertical signal processing which uses a specialized video-data filter known as a "polyphase" filter. In video-processing applications, a polyphase filter is used to resize pixels by manipulating data stored to represent the horizontal and vertical lines used to refresh the display. In such applications, expansion or up-sampling ("zoom-factor" greater than one) is achieved by increasing the ratio of the number of output pixels to the number of input pixels; whereas, compression or down-sampling ("zoom-factor" less than one) is achieved by decreasing the ratio of the number of output pixels to the number of input pixels.

Due to their different functions, the type of circuit used for such general purpose video signal processing is different than the type of filtering circuit used for expanding or compressing video data. For video-data expansion, a polyphase filter typically receives the data representing multiple pixels at a first pixel rate (e.g., two pixels per cycle), and processes the pixel data by circulating it through a dozen or so line buffers. The exact manner of circulation through the line buffers depends on the scaling factor. Using the many line buffers to circulate the data and effect an appropriate delay, the polyphase filter is able to output the data to a storage unit a slower pixel rate (e.g., one pixel per cycle).

During processing when the data is not being resized, the polyphase filter and its arrangement of circular line buffers is not needed. Thus, another circuit is used to present the multiple pixels at the same rate in which they are received; thus, if the multiple pixels are received at two pixels per cycle, then they are passed to the storage unit at two pixels per cycle. The storage unit for this processing mode is larger than the storage unit that receives data from the polyphase filter; using the above example two pixels per cycle pixel rate, the storage unit for this processing mode must be twice as large.

The present invention is directed to the above-mentioned goal of minimizing the amount and types of circuits required to implement these respective modes of pixel-data resizing and other types of pixel-data processing.

SUMMARY OF THE INVENTION

Various aspects of the present invention are directed to generic de-coupling of input and output rates of sampling data when line buffers are used, and in a more specific application to a reconfigurable pixel-data processing circuit in which line buffers are used for both a vertically pixel processing mode and a nonresizing processing mode.

Consistent with one specific example embodiment, the present invention is directed to a pixel-data processing circuit being adapted to resize pixel data in a first vertically processing mode and to be reconfigured to operate in a nonresizing mode, wherein each mode receives pixel data at a first pixel rate and outputs pixel data at a different pixel rate.

In another particular example embodiment, pixels are received at two pixels per cycle and output to a storage unit at one pixel per cycle. In a first operational resizing mode, the embodiment includes vertically processing pixel data including polyphase filtering and line-buffering the pixel data, resizing the received pixel data by circulating the data in the line buffers and by filtering the circulated data for the polyphase filtering, and presenting resized pixel data for storage at the first pixel rate. In a second operational nonresizing mode, the pixel data is processed by double-line buffering the pixel data, bypassing the polyphase filtering, and presenting nonresized pixel data for storage at the rate of one pixel per cycle. Using a control circuit, the pixel-data processing circuit can switch between the first operational resizing mode and the second operational nonresizing mode.

Other example embodiments of the present invention are respectively directed to various other related aspects including method, circuit, and system-based implementations of such processing.

The above summary of the present invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
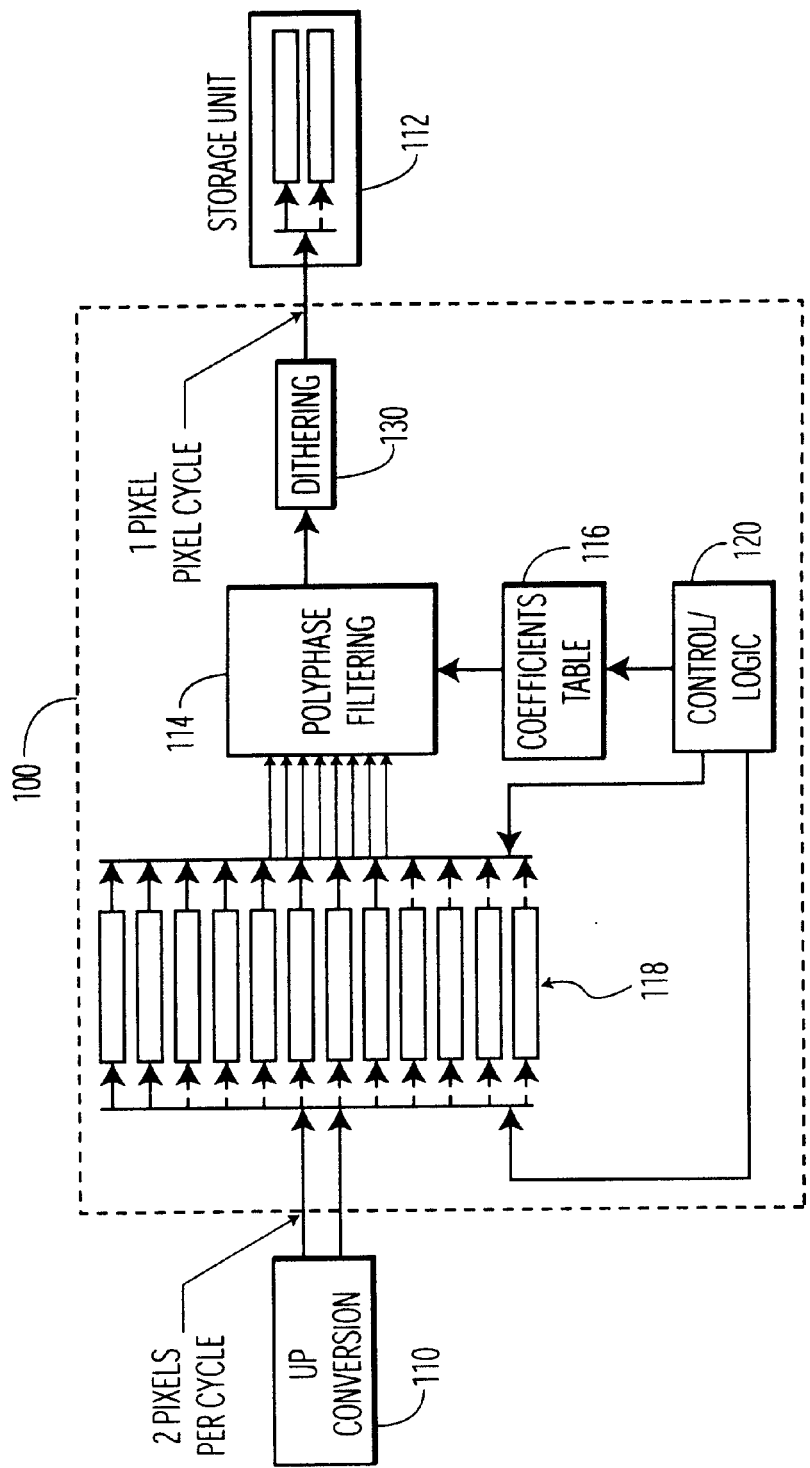
FIG. 1 is a diagram of an example pixel-processing arrangement illustrated using various vertical-data processing blocks, implemented for example using discrete logic or a programmable processor, according to the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF VARIOUS EXAMPLE EMBODIMENTS

The present invention is believed to be highly applicable to methods and arrangements for pixel processing where vertical pixel-data scaling is one of the modes of operation, and in applications involving generic de-coupling of input and output rates of sampling data when line buffers are used. The invention has been found to be particularly advantageous for pixel processing arrangements requiring or benefiting from use of the same line-buffers for operational modes including both vertical pixel-data scaling and non-scaling. While the present invention is not necessarily limited to such applications, an appreciation of various aspects of the invention is best gained through a discussion of examples in such an environment.

Consistent with a general embodiment, the present invention is implemented in the form of a reconfigurable data processing circuit having a data-manipulation circuit and line-buffer circuits that are used for applications such as scan-rate conversion where a typical frame rate, e.g., 50–60 frames per second, is increased for resizing and other purposes. The reconfigurable data processing circuit outputs data at a first rate while receiving data to be processed at another, different rate. The processing circuit includes a data-manipulation circuit and a line-buffer circuit that receives data at the other rate, and the processing circuit uses the data-manipulation circuit in a first operational mode to manipulate the data by circulating the data through the line buffers and the data-manipulation circuit. The manipulated data is then output for storage in the storage unit at the first rate. A logic circuit is used to cause the processing circuit to switch between the first operational mode and a second operational mode in which data is received at the other pixel rate, the received data is processed by double-buffering the data in the line-buffer circuit, the data-manipulation circuit is bypassed, and data is output for storage in the storage unit at the first pixel rate.

According to another example embodiment of the present invention, the invention is directed to a method for using line buffers in a vertical processing unit during a mode in which pixel data is vertically processed and then re-using a subset of the line buffers in a mode in which the vertically processing stages are bypassed but, in each mode, pixel data is received and output at different pixel rates. A particular implementation of the present invention employs a programmable processing circuit that is programmed to perform both modes of operation and to switch between the modes in response to an external command. The method performs the bypass operation without increasing the hardware cost and the design complexity, and does add line buffers for the storage unit but rather re-uses the existing line buffers for de-coupling the input rate of two pixels per cycle. The double buffering mechanism is performed at the vertical processing stage as well as the storage units. However, the vertical processing stage uses four fixed line buffers and the storage unit uses two line buffers. The invention saves buffer area in the storage and re-uses the vertical processing buffer for bypass operation.

Consistent with the above-described method, FIG. 1 illustrates processing blocks arranged and configured to process pixel data in a vertical processing unit 100 having one of two modes of operation. For the throughput of the vertical processing unit 100, the input rate for vertical processing is two pixels per cycle and the output rate is one pixel per cycle due to an up conversion unit 110 always outputting two pixels in one cycle. The up conversion unit outputs two pixels in the vertical direction. In order to receive the pixels, there are two line buffers. Further, in this particular implementation, the length of each line buffer is adequate for storing the data corresponding to one-hundred-twenty-eight pixels.

In a more particular example embodiment, vertical processing is implemented to perform vertical linear or non-linear sampling for a video signal input, and an 8-tap, 64-phase polyphase filter is used for expansion and compression operations. The line buffers in vertical processing are circulated depending on the scaling factor and geometrical position of output sampling pixels. In this regard, the polyphase filter can be adapted to filter the same pixels during the expansion operation. During the compression operation, some lines of pixels can be skipped. The line buffers are mainly used for de-coupling the input rate of incoming pixels for the scaling operation as well as the bypass mode of the vertical processing unit to the output pixels.

In FIG. 1, the vertical processing unit 100 produces processed pixel data at a rate of one pixel per cycle for storage in a memory (or storage unit) 112. The vertical processing unit 100 includes a polyphase filter having filtering stage 114 and coefficients table 116, a line-buffer circuit 118 including twelve line buffers and circuitry 120. The circuitry 120, which is implemented as logic or as a software routine for a programmable processor, is adapted to circulate data through the line-buffer circuit as is conventional when vertical scaling pixel data using a polyphase filter where the circulation of line buffers depends on the scaling factor. In this manner, the vertical processing circuit receives the pixel data at two pixels per cycle, resizes the data, and then outputs the resized pixel data for storage in the storage unit at a rate of one pixel per cycle.

The circuitry 120 also includes logic that is configured and arranged to cause the vertical processing circuit to switch between the first-mentioned resizing mode and a second mode in which the pixel data is not scaled. Via programming or another external prompt, the circuitry 120 disables the operation of the polyphase filter (114 and 116 of FIG. 1) and controls the line-buffer circuit 118 so that the received pixel data is double-buffered in the line-buffer circuit 118 using two of the line buffers. In this manner, the circulation of line buffers is for updating the new pixels every two consecutive line buffers, the polyphase filter is bypassed, and nonresized pixel data is output for storage in the storage unit at one pixel per cycle.

An optional dithering circuit 130 is used, when the application requires, to dither the data from nine bits to eight bits before the data is presented to the storage unit 112.

Figure 2:
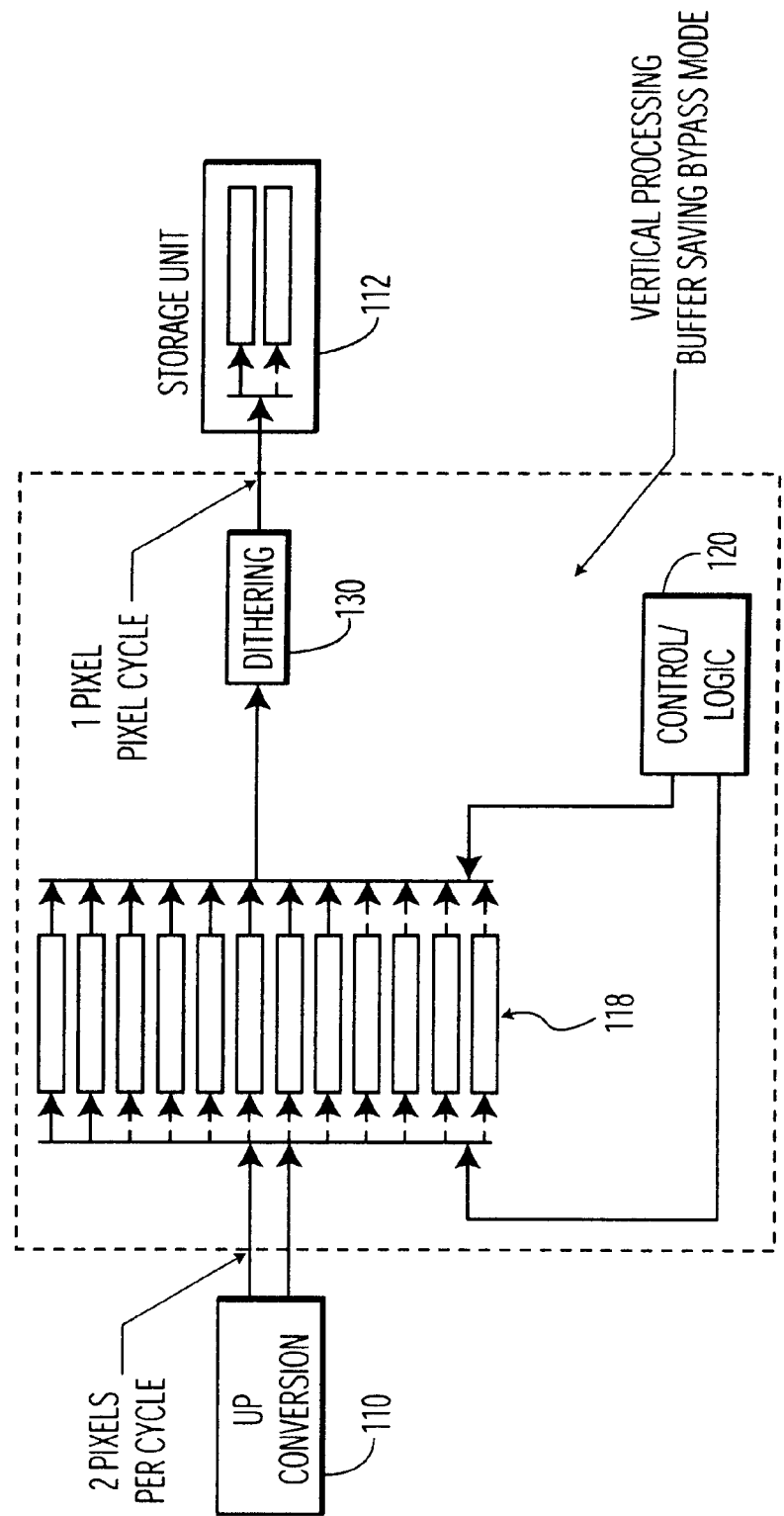
FIG. 2 is a diagram showing the arrangement of FIG. 1 in a mode having certain data processing blocks bypassed, also according to the present invention.

FIG. 2 is a diagram showing the arrangement of FIG. 1, conceptually, in the filter-bypass mode, according to the present invention. FIGS. 1 and 2 are identical except that FIG. 2 does not show the polyphase filter 114 and 116. The filter-bypass mode virtually permits all pixels to pass through the vertical processing circuit 100 without being processing by the polyphase filter and rather being sent directly into dithering and then to the storage unit 112. In effect, this mode completely disables the vertical processing unit. To employ the double buffering mechanism, the storage increases the line buffers up to four lines.

Accordingly, various embodiments have been described as example implementations of the present invention for saving hardware and offsetting complexity in pixel-data processing applications. In various implementations of the present invention, the number of line buffers required is reduced significantly, there is no extra cost in terms of hardware or design complexity, and throughput is not adversely affected by the bypass operation.

The present invention should not be considered limited to the particular examples described above. Various modifications, equivalent processes, as well as numerous structures to which the present invention may be applicable fall within the scope of the present invention, as fairly set forth in the appended claims.

What is claimed is:

1. A reconfigurable pixel-data processing circuit having at least one scaling mode, comprising:

a storage unit adapted to receive and store processed pixel data at a first pixel rate;

a vertical processing circuit including a polyphase filter and a line-buffer circuit, the vertical processing circuit having a first operational resizing mode in which pixel data is received at another pixel rate that is different than the first pixel rate, the received pixel data is resized by circulating the data in the line buffers and by filtering the circulated data using the polyphase filter, and resized pixel data is output for storage in the storage unit at the first pixel rate; and a logic circuit configured and arranged to cause the vertical processing circuit to switch between the first operational resizing mode and a second operational nonresizing mode in which pixel data is received at the other pixel rate, the received pixel data is processed by double-buffering the data in the line-buffer circuit, filtering using the polyphase filter is bypassed, and nonresized pixel data is output for storage in the storage unit at the first pixel rate.

2. The reconfigurable pixel-data processing circuit of claim 1, wherein in the first operational resizing mode, the vertical processing circuit delays the received pixel data, relative to the resized pixel data that is output for storage, as a function of a scaling factor defining the resized pixel data.

3. The reconfigurable pixel-data processing circuit of claim 1, wherein the first pixel rate is one pixels per cycle and the other pixel rate is two pixels per cycle.

4. The reconfigurable pixel-data processing circuit of claim 1, wherein in the other operational nonresizing mode, the polyphase filter is disabled.

5. The reconfigurable pixel-data processing circuit of claim 1, further including a dithering circuit configured and arranged to dither the filtered data output from the polyphase filter and to present the resized pixel data for storage in the storage unit at the first pixel rate.

6. The reconfigurable pixel-data processing circuit of claim 1, further including a dithering circuit configured and arranged to dither the data that bypasses the polyphase filter and to present nonresized pixel data for storage in the storage unit at the first pixel rate.

7. The reconfigurable pixel-data processing circuit of claim 1, further including a dithering circuit configured and arranged to dither the data from nine bits to eight bits before the data is presented for storage in the storage unit at the first pixel rate.

8. The reconfigurable pixel-data processing circuit of claim 1, wherein the line-buffer circuit includes multiple lines of buffers and said double-buffering the data in the line-buffer circuit includes using two of the multiple lines of buffers.

9. The reconfigurable pixel-data processing circuit of claim 1, wherein the line-buffer circuit includes twelve lines of buffers.

10. The reconfigurable pixel-data processing circuit of claim 9, wherein the polyphase filter includes a coefficients table and wherein the vertical processing circuit further includes a control circuit configured and arranged to control the line-buffer circulation circuit.

11. The reconfigurable pixel-data processing circuit of claim 10, wherein the polyphase filter includes a coefficients table and wherein the vertical processing circuit further includes a control circuit configured and arranged to control the line-buffer circulation circuit and, in the second operational nonresizing mode, to disable the polyphase filter.

12. The reconfigurable pixel-data processing circuit of claim 1, wherein the polyphase filter includes a coefficients table and wherein the vertical processing circuit further includes a control circuit configured and arranged to control the line-buffer circulation circuit.

13. A reconfigurable pixel-data processing circuit having at least one scaling mode, comprising:

storage means for receiving and storing processed pixel data at a first pixel rate;

vertical processing means for vertically processing pixel data, the vertical processing means including a polyphase filter and a line-buffer circuit, the vertical processing means having a first operational resizing mode in which pixel data is received at another pixel rate that is different than the first pixel rate, the received pixel data is resized by circulating the data in the line buffers and by filtering the circulated data using the polyphase filter, and resized pixel data is output for storage in the storage means at the first pixel rate; and means for causing the vertical processing means to switch between the first operational resizing mode and a second operational nonresizing mode in which pixel data is received at the other pixel rate, the received pixel data is processed by double-buffering the data in the line buffer circuit, filtering using the polyphase filter is bypassed, and nonresized pixel data is output for storage in the storage means at the first pixel rate.

14. A reconfigurable pixel-data processing circuit having at least one scaling mode, comprising:

a storage unit adapted to receive and store processed pixel data at one pixel per cycle;

a vertical processing circuit including a polyphase filter, a line-buffer circuit including at least twelve line buffers and a control circuit adapted to circulate data through the line-buffer circuit, the vertical processing circuit having a first operational resizing mode in which pixel data is received at two pixels per cycle, the control circuit causes the data to be resized by circulating the pixel data through the line-buffer circuit and by filtering the circulated data using the polyphase filter, and wherein the resized pixel data is output for storage in the storage unit at one pixel per cycle; and a logic circuit configured and arranged to cause the vertical processing circuit to switch between the first operational resizing mode and a second operational nonresizing mode in which pixel data is received at the other pixel rate, the received pixel data is processed by double-buffering the data using two of the line buffers, filtering using the polyphase filter is bypassed, and nonresized pixel data is output for storage in the storage unit at one pixel per cycle.

15. The reconfigurable pixel-data processing circuit of claim 14, wherein the control circuit and the logic circuit are implemented using a programmed processor.

16. The reconfigurable pixel-data processing circuit of claim 15, wherein the polyphase filter includes a coefficients table.

17. The reconfigurable pixel-data processing circuit of claim 16, further including a dithering circuit configured and arranged to dither the data before the data is presented for storage in the storage unit.

18. The reconfigurable pixel-data processing circuit of claim 17, wherein the dithering circuit is further configured and arranged to dither the data from 9 bits to 8 bits.

19. A method of pixel-data processing using a pixel-data processing circuit having at least one scaling mode, comprising:

receiving and storing processed pixel data at a first pixel rate;

in a first operational resizing mode in which pixel data is received at another pixel rate that is different than the first pixel rate, vertically processing pixel data including polyphase filtering and line-buffering the pixel data, resizing the received pixel data by circulating the data in the line buffers and by filtering the circulated data for the polyphase filtering, and presenting resized pixel data for storage at the first pixel rate;

in a second operational nonresizing mode in which pixel data is received at the other pixel rate, processing the received pixel data by double-line buffering the pixel data, bypassing the polyphase filtering, and presenting nonresized pixel data for storage at the first pixel rate; and switching between the first operational resizing mode and the second operational nonresizing mode.

20. The method of claim 19, further including using a programmed processor to implement the first operational resizing mode and the second operational nonresizing mode.

21. The method of claim 19, further including dithering the pixel data before the step of presenting nonresized pixel data for storage at the first pixel rate.

22. The method of claim 19, wherein polyphase filtering includes using a coefficients table.

23. The method of claim 19, further including dithering the data before the data is presented for storage in the storage unit.

24. The method of claim 19, further including dithering the data from 9 bits to 8 bits before the data is presented for storage in the storage unit.

25. The method of claim 19, wherein said switching includes disabling the polyphase filtering.

26. The method of claim 19, wherein said switching includes switching from the first operational resizing mode to the second operational nonresizing mode.

27. The method of claim 19, wherein said switching includes switching from the second operational nonresizing mode to the first operational resizing mode.

28. A reconfigurable data processing circuit, comprising:

a storage unit adapted to receive and store processed data at a first rate;

a processing circuit including a data-manipulation circuit and a line-buffer circuit that receives data at another rate that is different than the first rate, the processing circuit having a first operational mode in which the data is manipulated by circulating the data through the line buffers and the data-manipulation circuit, and wherein manipulated data is output for storage in the storage unit at the first rate; and a logic circuit configured and arranged to cause the processing circuit to switch between the first operational mode and a second operational mode in which data is received at the other pixel rate, the received data is processed by double-buffering the data in the line-buffer circuit, the data-manipulation circuit is bypassed, and data is output for storage in the storage unit at the first pixel rate.

* * * * *